United States Patent
Grumbles, III (10) Patent No.: US 10,034,123 B2
(45) Date of Patent: *Jul. 24, 2018

(54) AMBIENT CONDITION MEASUREMENT AND REPORTING SYSTEM

(71) Applicant: Ernest W. Grumbles, III, Saint Paul, MN (US)

(72) Inventor: Ernest W. Grumbles, III, Saint Paul, MN (US)

(*) Notice: Subject to any disclaimer, the term of this patent is extended or adjusted under 35 U.S.C. 154(b) by 290 days.

This patent is subject to a terminal disclaimer.

(21) Appl. No.: 14/798,514

(22) Filed: Jul. 14, 2015

(65) Prior Publication Data

US 2015/0319553 A1   Nov. 5, 2015

Related U.S. Application Data

(63) Continuation-in-part of application No. 13/681,376, filed on Nov. 19, 2012, now Pat. No. 9,082,290.

(60) Provisional application No. 61/561,471, filed on Nov. 18, 2011.

(51) Int. Cl.
| | |
|---|---|
| *G08C 19/00* | (2006.01) |
| *H04W 4/00* | (2018.01) |
| *G06Q 50/12* | (2012.01) |
| *H04Q 9/00* | (2006.01) |

(52) U.S. Cl.
CPC ............ *H04W 4/006* (2013.01); *G06Q 50/12* (2013.01); *H04Q 9/00* (2013.01); *H04Q 2209/40* (2013.01); *H04Q 2209/84* (2013.01)

(58) Field of Classification Search
CPC ........ G06Q 50/12; G08C 17/00; G08C 17/02; G08C 19/00; H04Q 9/00; H04Q 2209/40; H04Q 2209/80; H04Q 2209/84

USPC ............. 340/286.07, 286.08, 286.09, 539.1, 340/539.11, 573.1, 870.02, 870.03, 340/870.17; 455/414.1, 414.2, 456.1, 455/456.3; 705/22, 26, 37; 709/204, 709/219, 224

See application file for complete search history.

(56) References Cited

U.S. PATENT DOCUMENTS

| | | |
|---|---|---|
| 5,900,801 A | 5/1999 | Heagle |
| 6,810,343 B2 * | 10/2004 | McKee .................. G06Q 30/02 702/62 |
| 7,026,929 B1 | 4/2006 | Wallace |

(Continued)

OTHER PUBLICATIONS

Ribnick, Joshi, and Papanikolopoulos, Multi-Camera Monitoring of Human Activities at Critical Transportation Infrastructure Sites, Univ. of MN Intell. Transp. Sys. Inst, Jun. 2008.

(Continued)

*Primary Examiner* — Hung T Nguyen
(74) *Attorney, Agent, or Firm* — Grumbles Law PLLC; Paul Feng; Brittany Nanzig (57) ABSTRACT

The present invention relates to a system for measuring ambient and sensory conditions in venues using a number of real-time signals, including sound, temperature, light, motion, water usage, vibration, infrared signal and others. Ambient signal data is transmitted to a cloud-based application that stores the signal levels in a database, analyzes the data, and presents the information in a visual format for use by venues and by consumers. The system can, among other things, provide an overall measure of ambient conditions in a venue and allow those with environmental or sensory sensitivities or preferences to identify safe or suitable public venues.

20 Claims, 4 Drawing Sheets

(56) References Cited

U.S. PATENT DOCUMENTS

| | | | | |
|---|---|---|---|---|
| 7,243,050 B2* | 7/2007 | Armstrong | ............. | G08B 21/20 |
| | | | | 702/182 |
| 7,856,360 B2* | 12/2010 | Kramer | ................. | G06Q 30/02 |
| | | | | 705/1.1 |
| 8,078,152 B2* | 12/2011 | Partridge | ................ | G01S 19/45 |
| | | | | 455/414.1 |
| 8,725,805 B2 | 5/2014 | Rubio Andres et al. | | |
| 8,781,633 B2 | 7/2014 | Fata et al. | | |

OTHER PUBLICATIONS

Lardinois, Hoppit Launches the World's First Ambience Search Engine for Restaurants, TechCrunch, Apr. 10, 2012.
Hopscotch Group, LLC, http://www.hoppit.com/, launched Nov. 2010. Accessed Feb. 19, 2013.
Rowinski, Coming to a Bar Near You; Facial Recognition & Real-Time Data, The New York Times, Jun. 10, 2011.
Scenetap, LLC; http://scenetap.com, launched approx. Jun. 2011. Accessed Feb. 19, 2013.
Hung T Nguyen; Non-Final Office Action for U.S. Appl. No. 13/681,376; USPTO Communication; dated Sep. 16, 2014.

\* cited by examiner

AMBIENT CONDITION MEASUREMENT AND REPORTING SYSTEM

CROSS-REFERENCE TO RELATED APPLICATIONS

This application is a continuation-in-part of U.S. patent application Ser. No. 13/681,376, filed on Nov. 19, 2012 and issued on Jul. 14, 2015 with U.S. Pat. No. 9,082,290, titled CROWD ACTIVITY AND AMBIENT CONDITION MEASUREMENT AND REPORTING SYSTEM, which claims the benefit of U.S. Provisional Application Ser. No. 61/561,471, filed on Nov. 18, 2011, titled CROWD ACTIVITY MEASUREMENT AND REPORTING SYSTEM.

BACKGROUND

Consumers have an abundance of choices to make in social venues, whether bars, restaurants, clubs, coffee shops or other public locations where food, beverages or entertainment are provided. Many such venues vary in popularity, whether as to time of day, day of the week or season or as to normal fluctuation due to novelty. For example, a particular bar might have a small lunchtime crowd but a large evening crowd, or even late evening crowd. Alternatively, a particular restaurant in proximity to a sports venue may be very busy on game night but very slow at other times. The level of activity, except at certain times (i.e. middle of the night at a restaurant) is typically very difficult to predict.

The level of activity can greatly impact consumer desire to go to a particular venue. One type of consumer, a family with small children for example, may only want to go to restaurants that are quiet or slow enough to have immediate seating. Conversely, younger people or conventioneers may purposely want to go to venues that are loud and standing room only. In another example, music clubs may only become busy when an opening act comes on stage and this time can vary widely based on the band and number of opening acts.

Consumers have little way of knowing a real-time level of crowd activity at a venue unless they (a) travel to the venue or (b) call the venue. The first can be greatly impractical depending on the location of the venue or the desire of the consumer to guarantee in advance what the level of crowd activity is. It is a common occurrence for consumers to travel to a venue and find that a restaurant is too busy to accommodate seating except with a long wait time. Or consumers may travel to a venue and find that it is closed, or so slow that it would not be enjoyable to stay at the location. Other venue choices may not be in proximity to the first location, thus imposing further risk of lost time or frustration on the consumer.

Consumers could call particular venues and check on crowd level. However, many venues will not answer the phone or if they do, the information they provide is temporal—by the time consumers arrive at the destination, conditions have changed for the worse. While some restaurants do take reservations, which addresses concern for seating, many do not. Further, crowd level might affect whether someone goes to a particular venue even with a reservation (for example, a working lunch where it might be essential to have access to a quiet space).

For these and other reasons, consumers are often left with substantial risk of lost time and frustration when choosing an appropriate social venue because of the lack of real-time crowd activity information.

From the business standpoint there is frustration as well. Unless a consumer calls or tries to book a reservation, whether by phone or Internet, the consumer will not know in advance whether the venue is appropriate for the social gathering. So the business often has to address frustrated consumers who arrive expecting seating when there is a long wait or arrive expecting bustling activity when the venue is too quiet. Businesses have no way of broadcasting crowd activity level to let consumers have the benefit of this information.

Further, businesses that are slow when they are typically busy might like to communicate such information to consumers in need of immediate seating. Or businesses that are busy when they are typically slow might want to advertise activity level as a way of showing business success. Businesses may also want to be able to offer specials or deals that relate to specified activity levels.

While register sales may provide some measure of facility use, dollars spent by patrons could vary wildly from the actual number of patrons in the facility. Traditional door counters, primarily used for security or fire code compliance, provide no information about the level of crowd activity in the venue. 100 people in motion at a rock club will be much louder than 500 people sitting at a play.

Thus there is a need for a real-time crowd activity measurement and reporting system for social venues.

In addition to overall crowd effect, ambient conditions also affect the condition of a restaurant or other social venue, including the quality of overall experience. Monitoring and capturing of sound, light and temperature provide an overall ambient experience description that would be useful to venues: for patron enjoyment; for staff enjoyment and productivity; and for general conditions of the premises, including security and safety. So, sound level monitoring could provide data needed for the crowd activity measurement. However, temperature, in combination with sound level, could also provide crowd activity measurement. Noise, light and temperature also affect venue user experience, including for those with hearing or vision impairment, noise sensitivity or crowd-related anxiety. These are but additional reasons why an ambient condition monitor would be of great value.

SUMMARY

The present invention relates to a system for measuring ambient conditions in venues using a number of real-time signals, including sound, temperature, light, motion, water usage, vibration, infrared signal, stray voltage signals, and others. Ambient signal data is transmitted to a cloud-based application that stores the signal levels in a database and presents the information in a visual format for use by venues and by consumers. The system can, among other things, provide an overall measure of crowd activity in a venue.

Reference is made throughout the present disclosure to certain aspects of one embodiment of the system described herein. Such references to aspects of the presently described system do not limit the scope of the claims attached hereto. Additionally, any examples set forth in this disclosure are not intended to be limiting and merely set forth some of the many possible embodiments for the appended claims. It is to be understood that the phraseology and terminology used herein are for the purpose of description and should not be regarded as limiting.

DETAILED DESCRIPTION

The system described below measures crowd level at venues, whether public or private, through the use of real-time crowd signals: sound; light; temperature; motion; water usage; vibration; infrared signal, stray voltage signals, and others. The system further transmits the crowd signal information on a recurring basis to a cloud-based application that stores the signal levels in a database and further presents the information in a visual format. Venues or consumers can then view the data to determine activity levels at a given time.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims. It is understood that various omissions and substitutions of equivalents are contemplated as circumstances may suggest or render expedient, but these are intended to cover applications or embodiments without departing from the spirit or scope of the claims attached hereto. Also, it is to be understood that the phraseology and terminology used herein are for the purpose of description and should not be regarded as limiting.

A preferred embodiment will be described with regard to a nightclub. Inside the nightclub are one or more sound pressure level, or sound level, meters ("SPL meters") 104, such as the array shown in FIG. 1. In lieu of an SPL meter 104, any ambient condition sensor as described herein may be used. They can be standalone battery-powered units (such as a sound level datalogger) or could be hard-wired into a power supply (or power over Ethernet). From a data transmission standpoint, the units could operate wirelessly (via Wi-Fi or data network such as 3G or 4G) or via hardline (via Ethernet to a PC or other computer and then via internet or other data connection to a remote or local server) to transmit data via a network 404. This is described in more detail below in reference to FIG. 4. In one embodiment, the sound pressure level meter 104 is a self-ranging decibel meter (i.e., one that can adjust decibel range based on actual sound pressure ranges at a specific venue, such as 60-70 decibels; 70-80 etc. . . . ). Consumer smartphones with sound meter apps could also supply this data. The SPL units would measure sound pressure level and the remote crowd signal application would, on a periodic basis, capture the signal level and store in a database. For example, the system could grab crowd signal every five minutes and store for further use. As the sound level went up in the club due to increased crowd level, the signal level would go up.

As an alternative to sound pressure level measurement, other sound, noise or decibel level meters could be employed. For example, microphones could be used to record an audio signal, including signal intensity, and evaluate sound profile in the recording. The appropriate meters would be employed in the physical environment to capture and analyze sound signal intensity.

In some embodiments, the system may be able to determine and transmit data regarding the type of sound being made in an environment such as, but not limited to, human conversation, music, machines, industrial noise, dissonant tones, and television. Further, it may be able to determine and transmit data regarding the type of music, such as country, rock, jazz, or punk, and the profile of the sound, such as background noise or focused noise.

Figure 1:
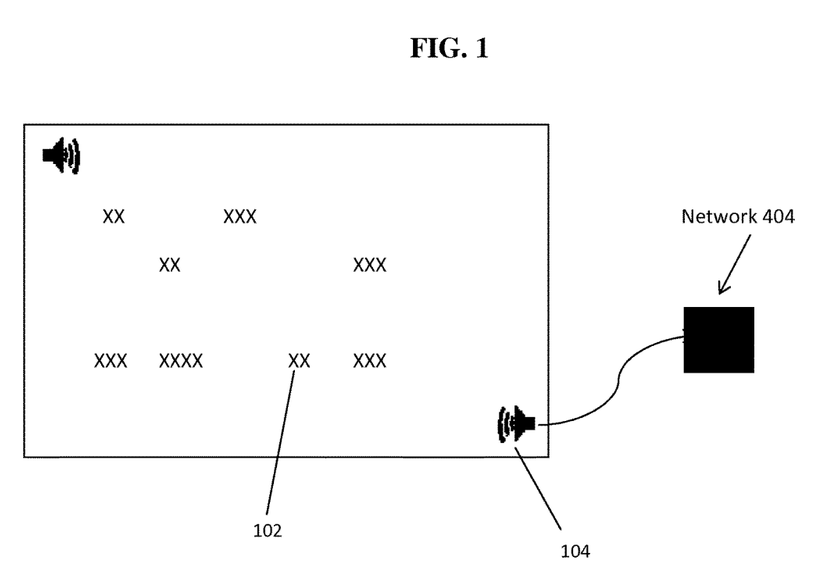
FIG. 1 is an example of the system in use at a venue with an array of sound pressure level meters or ambient condition sensors set up within the venue.

Signals in addition to sound- or noise-based ones could also be employed as an alternative to, or in combination with, those that are sound-based. For example, one or more motion sensors could be used to measure overall intensity of physical motion in a given space. Vibration sensors could also be used to similar effect—as the level of physical activity in a space increased, the vibration signal would increase. Also possible would be temperature sensors or infrared signal meters. As the level of people 102 in a given space increased, the temperature or infrared heat signal would increase. Similarly, $CO_2$ level could be tracked with a carbon dioxide sensor as its level would increase with the number of people in a space.

Two other modalities could work as well: (a) water usage measurement and (b) cellphone signal detection. In the first, a flow meter or vibration sensor would be connected to an outgoing or incoming water pipe. As the number of persons increased, the water usage level would increase, whether in the kitchen or in the bathroom. The flow meter or vibration sensor would measure and track this increase and decrease. Regarding cellphone usage, a single or multi-modal cellphone signal detector (3G, voice, Wi-Fi, Bluetooth) would detect outbound signals. As the number of persons 102 in the venue increased, the number of overall cellphone signals would increase. Given that approximately 80% of U.S. population has a cellphone, this could be a reasonably accurate measure of crowd intensity.

Alternatively, one or more of these sensors could be combined to enhance or validate crowd activity or noise signal. For example, a sound pressure level meter signal 104 could be combined with a temperature or infrared signal to provide an enhanced crowd measurement signal or one that better avoids temporary distortions that may provide a false signal. Also, the crowd activity signal could be combined with real-time social network feeds that correlate published crowd location with the crowd signal. This also could potentially provide enhanced crowd activity data.

In addition to overall crowd effect, ambient conditions also provide very useful data on the overall quality and status of experience of a venue. These include sound, described above, but also light and temperature. Whether or not a venue is busy, noise conditions may impair the experience of patrons and could indicate an unacceptable risk to employee hearing, which is the subject of federal and state regulation (such as OSHA). Consumers for a variety of reasons may seek a quieter environment, whether for personal enjoyment or hearing impairment or other health condition (such as noise sensitivity related to various neurological conditions).

Temperature is also a personal comfort issue. Patrons sensitive to cold or heat, or simply seeking colder or warmer environments, would be able to view real-time temperature conditions, which, along with sound or light, would affect overall experience. Temperature is also a factor in employee satisfaction and productivity. Thus, a venue might want to optimize these conditions in real time and correlate with sound and light for enhanced effect. Standard temperature sensors, for example, like those used in home-based thermostats, could be used in a combined ambient monitoring device.

Further, light conditions also affect overall venue experience. Light, along with sound, present the biggest impacts on patron experience—loud sounds with dark lighting; soft sounds with bright lighting; and other combinations.

Patrons may seek brighter or darker environments for a variety of reasons, including personal enjoyment and light sensitivity (whether due to vision impairment or neurological conditions, such as epilepsy). Light conditions can also affect employee work and productivity. If conditions are too dark, this could present a safety risk. If conditions are too bright, that could adversely affect work conditions (through stress).

The system may also be able to differentiate between different kinds of light. For example, it may include an optical light detector or other "light frequency detector" that, in addition to detecting how bright or dark an environment is, can detect the level of ultraviolet light, infrared light, or other harmful versions of light outside of the light spectrum. The sensors could also detect non-visible radiofrequency transmissions or presence in a particular environment. In an example of a café, a potential consumer may wish to avoid increased exposure to ultraviolet light. If a café has a large number of windows, is an open-air café, or is exposed in some other way to a lot of natural light, the sensors inside the café can detect the ultraviolet waves and transmit the relevant data regarding levels of ultraviolet light. If a café has a lot of natural light but not a lot of ultraviolet exposure, the café can market this "low ultraviolet" environment to consumers who are sensitive to ultraviolet light.

A spike in light conditions, with or without a spike in sound conditions, at specific times, could also represent entrance into a specific venue, whether authorized (employees) or unauthorized (intruders). Thus the system could function as additional security. The system could also determine and collect data regarding the frequency of variability of the temperature. A rapid change in temperature, whether high or low, could indicate a climate control failure or possibly fire. A real-time messaging featuring, via SMS, email or other system, could deliver this data to specified accounts upon its occurrence.

Depending on the categorization of the input signal, such as sound, light, or temperature, the system could flag certain detections for groups with specific sensitivity such as epilepsy or autism. For example, certain frequencies of light, such as a high frequency strobe light, will tend to trigger an epileptic reaction while other frequencies of light, such as a lighthouse, will not trigger an epileptic reaction. In another example, certain noise levels or noise types may make it difficult for people with hearing loss to hold a conversation with another person. By flagging these particular environments, individuals will better be able to select an environment suited to their needs.

Figure 2:
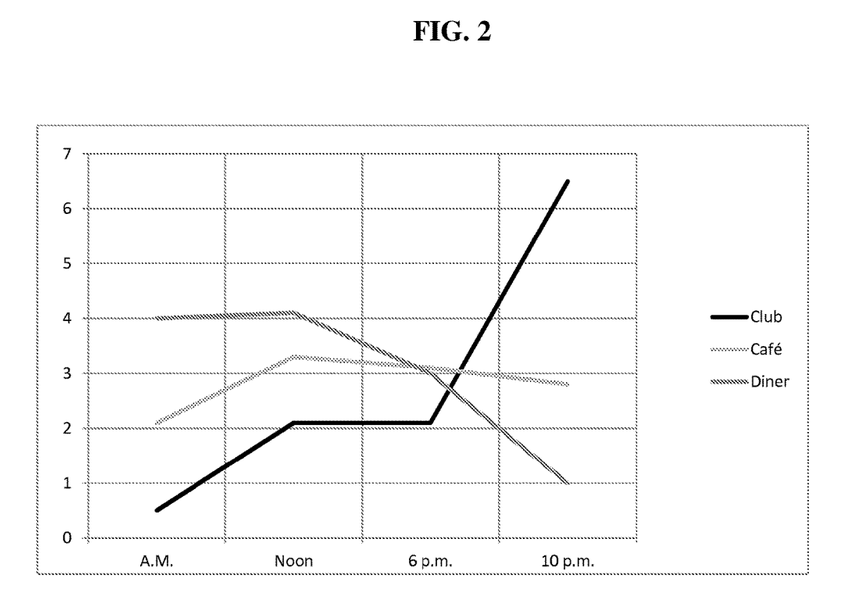
FIG. 2 is an example comparative plot of sound pressure data for three venues during the course of a given day.

On the server side, the application could track the crowd activity signal at varying points and store in records uniquely associated with the specific venue. The crowd signal data would be stored with specific times. In this way, both real-time and historical data on sound pressure level, for example, could be maintained, including averages for specific days and times of day. The crowd intensity signal could be converted into a numerical scale value that could allow for simple comparison between different venues. Both real-time and average intensity scores could be included in the comparison set. See FIG. 2 as an example comparative plot of sound pressure data for 3 venues during the course of a given day. Levels of light, temperature and other data types could be presented this way as well.

The venue itself would be associated in the database with geographic location at different levels. In this way, both real-time and average crowd intensity levels could be evaluated from a single venue all the way up to blocks, neighborhoods, cities, regions, and states (or higher geographic levels as well).

With the data above regularly captured and analyzed, it can then be made available for use by both venues and consumers. Venues could review the data in a tabular or visual format to see how they are doing from a comparative buzz standpoint—as opposed to just measuring against their own historical cash register performance. Crowd intensity data would enable venues to offer time-specific specials to draw in customers. Such specials could be generated manually in response to a slow night. Alternatively, specials could be set to be published automatically when either (a) a given venue's performance is off compared to its own historical average or (b) when crowd signal is lower compared to similar venues in an area.

Figure 3:
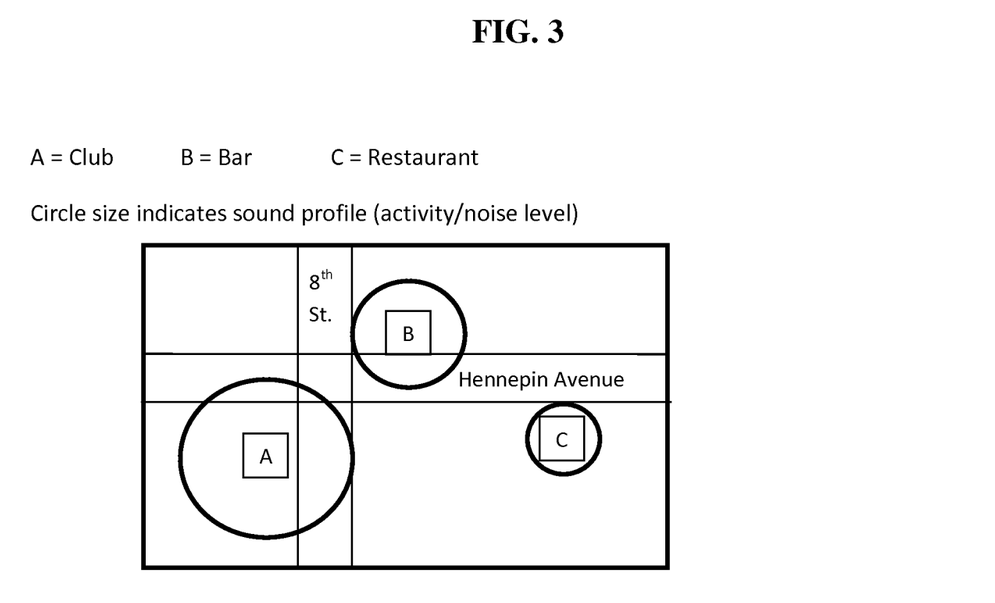
FIG. 3 is an example of a map that could show where hot or cold venues are located at a given point in time on an example visual interface.

Crowd intensity or other ambient condition signal data would also be made available for call by remote personal devices, such as smartphones, tablet computers and PC's, and presented either in a browser or in a native app interface. Consumers could see maps such as that depicted in FIG. 3 showing where the hot and cold venues are—and the map could toggle to only show cold (quiet) locations or only hot (busy) locations. If consumers are new to town and want to see where the hot spots are, they can see in an instant. Or if they are looking for a quiet spot for dinner, or someplace with immediate seating, they can see that as well. Those with hearing-related challenges or noise sensitivity will find this especially useful.

The ambient condition signals could also be averaged over time to provide a rating useful for general purposes—when temporal data may not be as important as a generally applicable crowd activity rating. Also, the crowd activity signal could be used to facilitate on-the-spot reservations, whereby consumers could rapidly choose a venue and book a reservation.

Trend data will also be available—which are the next hot spots, and which are cooling down? In one embodiment, consumers will able to use a mobile app with mapping to see what parts of town or which individual venues are trending up in activity. In this way, they will detect newer or re-surging venues and be able to enjoy these venues more quickly.

Other data that may be available is rate of change data. For example, the system may be able to pick up on rapid changes in light signals such as, but not limited to, very quick bright and dark signals that may indicate strobe lights or flickering lights. Therefore, if there is a lot of variation in the signal over time, the system can detect it. This type of information in regard to light signals will be useful for individuals with conditions such as epilepsy since flickering or flashing lights may induce a seizure. Further, even if an individual does not have a medical condition, the individual may not want to be in an environment with flashing lights because it indicates a setting or environment that is not calm, such as a nightclub.

The system may also pick up on rapid changes in sound signals such as, but not limited to, very quick loud and soft signals that may indicate a setting that is less calm. For example, a club or bar may vary quickly between very loud noises and no noise. In another example, a restaurant or café on a busy street may be generally quiet until traffic drives by or construction starts, at which time the traffic or construction could cause very loud noises. In yet another example, a live band may cause a setting to be loud during songs, but quiet between songs.

City law enforcement and emergency management authorities may also have reason to use the data output from the system. For either, knowledge that crowds, especially loud ones, are rapidly increasing in a given area could indicate the need for additional public safety protection, whether to maintain normal public order on the sidewalks or to manage an actual emergency. They would be able to direct resources, especially at evening times, where the people actually are at a given point in time, not just where they have been historically.

Figure 4:
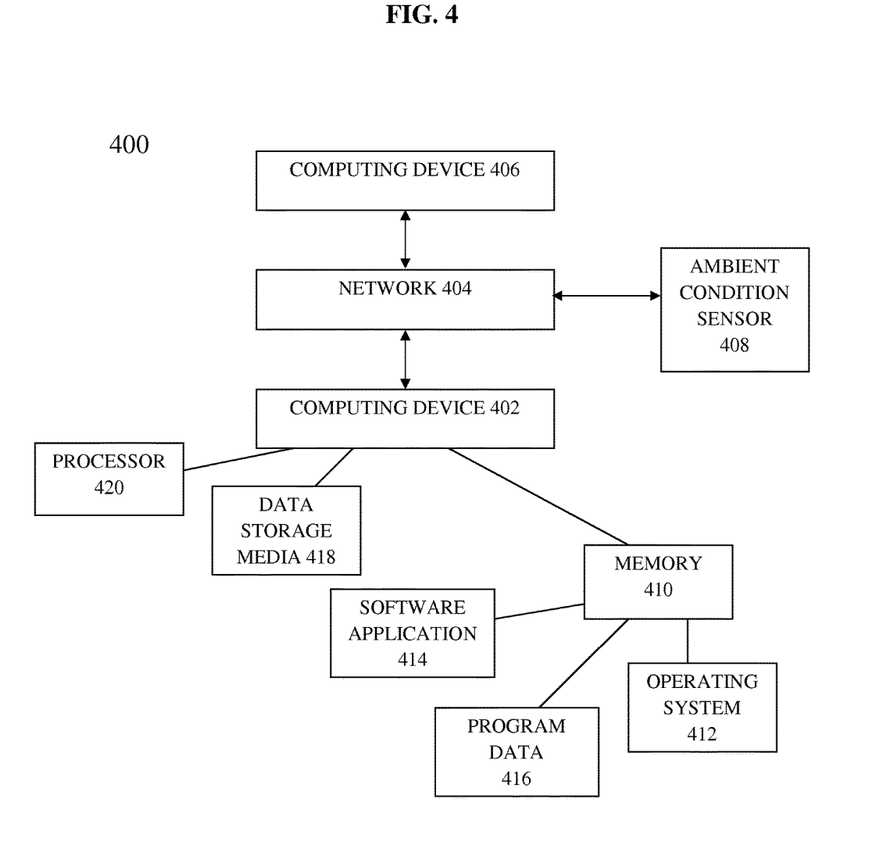
FIG. 4 is a schematic block diagram of an example computing system.

The disclosed system is computer-implemented and uses a computing system. FIG. 4 is a schematic block diagram of an example computing system 400. The example computing system 400 includes at least one computing device 402 and at least one ambient condition sensor 408 (sound pressure, light, temperature or other). The ambient condition sensors are of the types known to those skilled in the art. The devices can be powered by any conventional power supply, whether battery, DC or AC connection, power over Ethernet or other types. In some embodiments the computing system 400 further includes a communication network 404 (such as the internet or a cellular network) and one or more additional computing devices 406 (such as a server).

Computing device 402 can be, for example, a smart phone or other mobile device, a tablet computing device, a netbook, a computing device located in a user's home or office, or any other computing device. Computing device 402 can be a stand-alone computing device or a networked computing device that communicates with one or more other additional computing devices across a network 404. The additional computing device(s) can be, for example, located remote from the initial computing device 402, but configured for data communication with the initial computing device 402 across a network 404. Computing device 406 can be, for example, a server. The ambient condition sensor 408 is networked to communicate with one or more computing devices 402 and/or computing device or server 406 across a network 404.

In some examples, the computing device 402 includes at least one processor or processing unit 420 and system memory 410. Depending on the exact configuration and type of computing device, the system memory 410 may be volatile (such as RAM), nonvolatile (such as ROM, flash memory, etc.) or some combination of the two. System memory 410 typically includes an operating system 412 suitable for controlling the operation of the computing device, such as the WINDOWS® operating systems from Microsoft Corporation of Redmond, Wash., or a server, such as Windows SharePoint Server, also from Microsoft Corporation. To provide further example, if the computing device 402 is a smart phone or other mobile device, the operating system 412 may be iOS, WP7, or any other available mobile operating system. The system memory 410 may also include one or more software applications 414 and may include program data 416. The software applications 414 may be in the form of mobile applications in examples wherein the computing device 402 is a mobile device.

The computing device 402 may have additional features or functionality. For example, the device may also include additional data storage devices 418 (removable and/or non-removable) such as, for example, magnetic disks, optical disks, or tape. Computer storage media 418 may include volatile and nonvolatile, removable and non-removable media implemented in any method or technology for storage of information, such as computer readable instructions, data structures, program modules, or other data. System memory, removable storage and non-removable storage are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device. An example of computer storage media 418 is non-transitory media. The computing device 406 may include data storage media such as the data storage media 418 described above, on which data is stored.

In some examples, one or more of the computing devices 402, 406 can be located in a venue or place of business. In other examples, the computing device can be a personal computing device that is networked to allow the user to access the system disclosed herein at a remote location, such as in a user's home or other location. In some embodiments, the computing device is a smart phone or other mobile device. In some embodiments some components of the disclosed system are stored as data instructions for a smart phone application. A network 404 facilitates communication between the computing device 402 and one or more servers, such as an additional computing device 406, that host the disclosed system. The network 404 may be a wide variety of different types of electronic communication networks. For example, the network may be a wide-area network, such as the Internet, a local-area network, a metropolitan-area network, a cellular network or another type of electronic communication network. The network may include wired and/or wireless data links. A variety of communications protocols may be used in the network 404 including, but not limited to, Ethernet, Transport Control Protocol (TCP), Internet Protocol (IP), Hypertext Transfer Protocol (HTTP), SOAP, remote procedure call protocols, and/or other types of communications protocols.

In some examples, the additional computing device 406 is a Web server. In this example, the initial computing device 402 includes a Web browser that communicates with the Web server to request and retrieve data. The data is then displayed to the user, such as using a Web browser software application. In some embodiments, the various operations, methods, and rules disclosed herein are implemented by instructions stored in memory. When the processor of one or more of computing devices 402 and 406 executes the instructions, the instructions cause the processor to perform one or more of the operations or methods disclosed herein.

The system and method can also include location-data captured by a GPS-enabled application or device. The computing device 402 may also have Wi-Fi or 3G capabilities.

The various embodiments described above are provided by way of illustration only and should not be construed to limit the claims attached hereto. Those skilled in the art will readily recognize various modifications and changes that may be made without following the example embodiments and applications illustrated and described herein and without departing from the true spirit and scope of the following claims.

What is claimed is:

1. A system for selecting a venue for a person with environmental or neurological sensitivity, the system comprising:

a first and second set of sensors, each set of sensors including:
   a sound pressure level meter configured to transmit data; and
   a light sensor configured to transmit data;
a network for management of the first and second sets of sensors and for transmission of data from the first and second sets of sensors;
a computing device;
a data storage device located on the computing device for storing data from at least the first set of sensors;
a server configured to receive data from the first and second sets of sensors, including locations of the first and second sets of sensors, the server further comprising a web server configured to transmit at least part of the data from the first and second sets of sensors by sending data to the computing device; and
a software program located on the server;
wherein
   the first set of sensors is located at a first venue with a first location;
   the second set of sensors is located at a second venue with a second location;
   the software program collects a first set of data from the first set of sensors at defined, repeated intervals;
   the software program stores and analyzes the collected first set of data;
   the analysis of the collected first set of data results in a first environmental intensity profile comprising real-time data for sound, real-time data for light, averaged data at specified times for sound, averaged data at specified times for light, rate of change data for sound, and rate of change data for light;
   the software program collects a second set of data from the second set of sensors at defined, repeated intervals;
   the software program stores and analyzes the collected second set of data;
   the analysis of the collected second set of data results in a second environmental intensity profile comprising real-time data for sound, real-time data for light, averaged data at specified times for sound, averaged data at specified times for light, rate of change data for sound, and rate of change data for light;
   the software program pairs the first environmental intensity profile with the first location to make a first pair, the second environmental intensity profile with the second location to make a second pair;
   the server is configured to serve the first pair and the second pair to the computing device and a plurality of other computing devices;
   the computing device and the plurality of other computing devices execute software applications configured to permit users to choose whether to view the first pair, the second pair, or both simultaneously.

2. The system of claim 1, wherein the first and second environmental intensity profiles are displayed by the software applications as numerical values.

3. The system of claim 2, wherein the first and second environmental intensity profiles are displayed by the software applications as visual depictions of the numerical values.

4. The system of claim 3, wherein the visual depictions are circles around each of the first and second locations corresponding to the paired environmental intensity profile of the location.

5. The system of claim 1, wherein the first and second pairs are displayed by the software applications on a map.

6. The system of claim 1, wherein each set of sensors further includes an infrared sensor configured to transmit data.

7. The system of claim 1, wherein each set of sensors further includes a vibration sensor configured to transmit data.

8. The system of claim 1, wherein the computing device is a mobile computing device.

9. The system of claim 1, wherein the computing device is a personal computer.

10. The system of claim 8, wherein the first set of sensors includes sensors of the mobile computing device.

11. The system of claim 1, wherein the software applications are configured to display the first and second pairs on a map.

12. The system of claim 11, wherein the software applications are configured to display the first and second ambient conditions profiles as circles around each of the first and second locations corresponding to the paired ambient conditions profiles.

13. The system of claim 11, wherein the software applications are configured to display only quiet locations of the first and second pairs, wherein quiet locations are identified from ambient conditions profiles.

14. The system of claim 11, wherein the software applications are configured to display only busy locations of the first and second pairs, wherein busy locations are identified from ambient conditions profiles.

15. A system for selecting a venue, the system comprising:
a smartphone having a first set of sensors, the first set of sensors including a microphone and a light sensor, the smartphone being configured to transmit data from the first set of sensors;
a sensing device having a second set of sensors, the second set of sensors including a microphone and a light sensor, the sensing device configured to transmit data from the second set of sensors;
a network configured to provide transmission of data from the first set of sensors of the smartphone and the second set of sensors of the sensing device; and
a server executing software to receive and process data from the first set of sensors of the smartphone and the second set of sensors of the sensing device, including locations of the smartphone and the sensing device,
wherein:
   the first set of sensors of the smartphone is located at a first venue with a first location;
   the second set of sensors of the sensing device is located at a second venue with a second location;
   the server executing software collects a first set of data from the first set of sensors at repeated intervals;
   the server executing software stores and analyzes the collected first set of data;
   the analysis of the collected first set of data results in a first environmental intensity profile that includes current data for sound, current data for light, averaged data at specified times for sound, and averaged data at specified times for light;
   the server executing software collects a second set of data from the second set of sensors at repeated intervals;
   the server executing software stores and analyzes the collected second set of data;

the analysis of the collected second set of data results in a second environmental intensity profile comprising current data for sound, current data for light, averaged data at specified times for sound, and averaged data at specified times for light;

the server executing software pairs the first environmental intensity profile with the first location to make a first pair, and pairs the second environmental intensity profile with the second location to make a second pair;

the server is configured to serve the first pair and the second pair to the smartphone and a plurality of other computing devices;

the smartphone and the plurality of other computing devices execute software applications configured to permit users to choose whether to view the first pair, the second pair, or both simultaneously.

16. The system of claim 15, wherein the sensing device is another smartphone.

17. A system for selecting a venue, the system comprising:

a first smartphone having a first set of sensors including at least one of a microphone, a light sensor, and a temperature sensor, the smartphone being configured to transmit data on ambient conditions from the first set of sensors;

a second smartphone having a second set of sensors, the second set of sensors including at least one of a microphone, a light sensor, and a temperature sensor, the second smartphone configured to transmit data on ambient conditions from the second set of sensors;

a network configured to provide transmission of data between at least the first smartphone, the second smartphone, and a cloud-based application; and a cloud-based application configured to receive and process ambient conditions data from the first set of sensors of the first smartphone and ambient conditions data from the second set of sensors of the second smartphone, including locations of the first smartphone and the second smartphone, wherein:

the first smartphone is located at a first venue with a first location;

the second smartphone is located at a second venue with a second location;

the first smartphone captures ambient conditions data from the first set of sensors on a periodic basis;

the second smartphone captures ambient conditions data from the second set of sensors on a periodic basis;

the cloud-based application collects ambient conditions data from each of the first set of sensors of the first smartphone and the second set of sensors of the second smartphone on a recurring basis;

the cloud-based application stores and analyzes the collected ambient conditions data;

the analysis of the collected ambient conditions data of the first set of sensors results in a first ambient conditions profile that includes current data for the first set of sensors, averaged data for the first set of sensors, and trend data for the first set of sensors;

the analysis of the collected ambient conditions data of the second set of sensors results in a second ambient conditions profile that includes current data for the second set of sensors, averaged data for the second set of sensors, and trend data for the second set of sensors;

the cloud-based application pairs the first ambient conditions profile with the first location to make a first pair, and pairs the second ambient conditions profile with the second location to make a second pair;

the cloud-based application is configured to serve the first pair and the second pair to the first smartphone, the second smartphone, and a plurality of other computing devices;

the first smartphone, the second smartphone, and the plurality of other computing devices execute software applications configured to permit users to choose whether to view the first pair, the second pair, or both simultaneously.

18. The system of claim 17, wherein the software applications are configured to display the first and second ambient conditions profiles as numerical values.

19. The system of claim 17, wherein the first set of sensors includes a microphone and a light sensor.

20. The system of claim 17, wherein the first set of sensors and the second set of sensors each includes a microphone and a light sensor.

* * * * *